United States Patent [19]

Logie et al.

[11] Patent Number: 4,869,462

[45] Date of Patent: Sep. 26, 1989

[54] ELECTROMAGNETIC VALVE

[75] Inventors: Frank M. Logie; James C. Potter, both of London, England

[73] Assignee: Lucas Industries Public Limited Company, Birmingham, England

[21] Appl. No.: 270,267

[22] Filed: Nov. 14, 1988

[30] Foreign Application Priority Data

Nov. 24, 1987 [GB] United Kingdom ................ 8727458

[51] Int. Cl.$^{4}$ ............................................ F16K 31/06

[52] U.S. Cl. ........................... 251/129.16; 251/129.19

[58] Field of Search ...................... 251/129.19, 129.16

[56] References Cited

U.S. PATENT DOCUMENTS 2,980,139 4/1961 Lynn ......................... 251/129.19 X 4,717,118 1/1988 Potter ........................ 251/129.19 X

*Primary Examiner*—Arnold Rosenthal

*Attorney, Agent, or Firm*—Balogh, Osann, Kramer, Dvorak, Genova & Traub

[57] ABSTRACT

An electromagnetically operable valve comprises a valve member slidable in a bore in which there is a seating. The valve member is moved to the closed position by a solenoid having an armature. A tubular coupling member is secured to the armature and is connected to the valve member through an overtravel spring housed within the coupling member. The coupling member has a flange for engagement with a stop surface to limit the movement of the armature after the valve member has contacted the seating. A return spring is also housed within the coupling member.

5 Claims, 1 Drawing Sheet

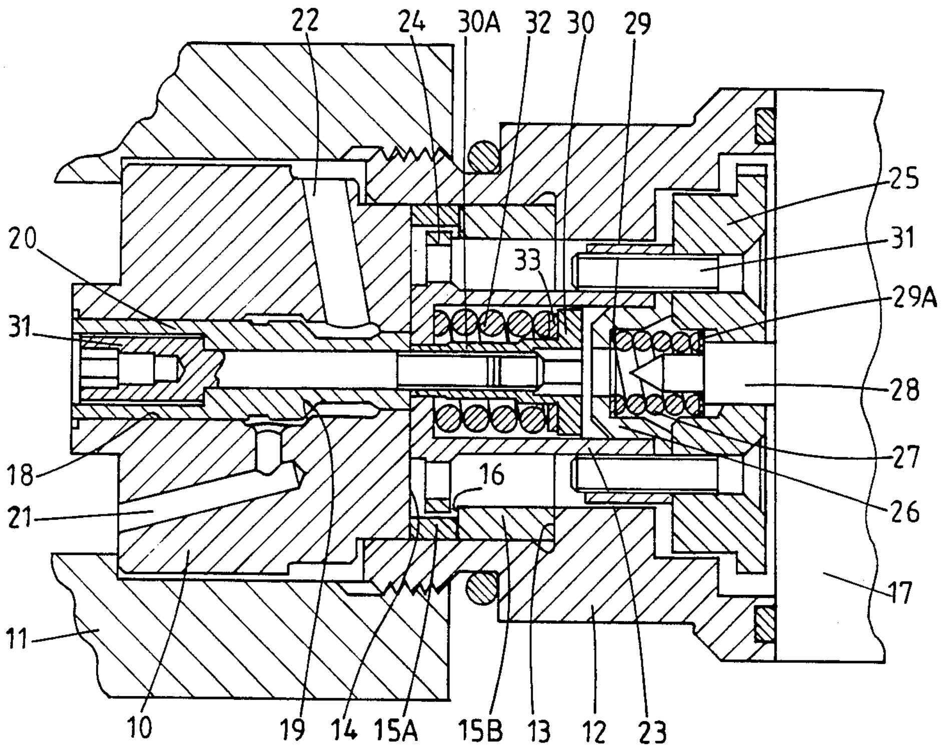
22
24
30A
32
30
29
25
31
29A
28
27
26
17
20
31
33
18
21
16
11
10
19
14
15A
15B
13
12
23

ELECTROMAGNETIC VALVE

This invention relates to an electromagnetically operable valve comprising a valve member slidable in a bore, an armature coupled to the valve member, a solenoid which when energised causes movement of the armature in a direction to close the valve member onto a seating, a lost motion spring which yields to allow further movement of the armature under the magnetic field produced by the solenoid after the valve member has contacted the seating and a return spring operable to restore the armature and valve member when the solenoid is de-energised.

With such a valve it is necessary to control the extent of movement of the valve member away from the seating when the solenoid is de-energised and it is also necessary to control the extent of movement of the armature towards the solenoid in order to ensure that at the limit of movement of the armature under the action of the solenoid, there is an air gap between the armature and the pole faces of the solenoid.

The object of the invention is to provide a valve of the kind specified in a simple and convenient form.

According to the invention an electromagnetically operable valve comprises a valve body, a bore formed in the body and a seating defined in the bore, a valve member slidable in the bore and movable in a direction towards one end of the bore to engage the seating, the valve member in the closed position projecting from the bore by a distance corresponding to the lift of the valve member from the seating to its fully open position, whereby in the fully open position an end surface of the valve member is flush with a first stop surface defined by the valve body, a hollow coupling member defining a first surface for engagement with said first stop surface, a spring abutment movable surface defined by the valve body, a hollow coupling member defining a first surface for engagement with said first stop surface, a spring abutment movable within the coupling member, means connecting the spring abutment to the valve member, a coiled compression spring acting intermediate the spring abutment and said coupling member, said spring yielding to allow continued movement of the coupling member away from said first stop surface following engagement of the valve member with the seating, a hollow housing part engaging said first stop surface, a solenoid housing engaged with said housing part, a second stop surface defined by said housing part and a second surface defined by said coupling member, said second surface engaging with said second stop surface to limit the movement of the coupling member away from said first stop surface, an armature mounted on said coupling member, the engagement of said second surface and said second stop surface acting to limit the movement of the armature towards pole faces defined by the solenoid when the solenoid is energised and resilient means acting on the coupling member for returning the coupling member towards said first stop surface when the solenoid is de-energised.

An example of a valve in accordance with the invention will now be described with reference to the accompanying drawing which is a sectional side elevation of the valve.

With reference to FIG. 1 the valve comprises a valve body 10 which is located within a pump body 11 of a fuel injection pump. The valve body is retained in position against a locating surface in the pump body by means of an annular housing part 12 a portion of which is screw threaded for engagement with a complementary thread formed in the pump body. A step 13 is formed in the housing part 12 and this defines a thrust surface facing towards the valve body. Intermediate the thrust surface of the flange and a first stop surface 14 defined by the valve body is a pair of spacer rings 15A, 15B, the ring 15B having a smaller internal diameter than the ring 15A. The ring 15B defines a second stop surface 16 facing but spaced from the first stop surface 14. At its end remote from the valve body the housing part 12 engages a solenoid housing 17 in which is located a solenoid having for example, an "E" core, the pole faces of which are flush with the surface of the solenoid housing engaged with the housing part. The solenoid is secured to housing part by screws not shown and the housing part has an intermediate portion of its peripheral surface shaped for engagement by a spanner.

Within the valve body is defined a bore 18 the axis of which is normal to said stop surface 14, and formed in the bore is a seating 19. Within the bore is located a slidable valve member 20 which is shaped for co-operation with the seating. Extending from the bore on opposite sides of the seating are passages 21, 22 respectively, the passage 21 being connected to the pumping chamber of the fuel pump and the passage 22 to a drain. The valve member is of tubular form and in the open position the end surface of the valve member lies flush with the first stop surface 14.

Within the housing part 12 there is located an axially movable coupling member 23 which near its end adjacent the valve body defines an apertured flange 24 which is located with axial clearance between the first stop surface 14 and the second stop surface 16. Mounted upon the end of the coupling member remote from the valve body is an armature 25 and an annular recess is defined between the end of the coupling member and the armature, the recess accommodating an outwardly extending flange of a cup-shaped spring abutment 26 which locates in the bore defined by the coupling member. The abutment 26 houses resilient means in the form of a coiled compression spring 27 the end of which adjacent the armature is engaged with a plate 29A carried by a thrust piece 28 which extends through the armature into contact with the core of the solenoid. A hardened washer 29 is provided between the spring 27 and the base wall of the abutment 26.

Within the coupling member 23 there is located a spring abutment 30 which has a tubular portion 30A slidable within an opening defined by an inwardly extending portion of the flange 24. The abutment 30 is held in engagement with the end surface of the valve member 20 by means of a through bolt 31 which extends through the valve member and is in screw thread engagement with the tubular portion 30A. In an alternative arrangement the valve member has an integral threaded extension of reduced diameter which is engaged by the tubular portion. Interposed between the flange of the coupling member and the spring abutment 30 is an overtravel spring 32. The action of the spring 32 is to urge the coupling member into engagement with the end of the valve member. The preload of the spring 32 can be determined by means of a shim 33.

In operation, the spring 27 urges the end surface of the coupling member 23 into engagement with the stop surface 14 and the valve member is lifted from its seating. When the solenoid is energised the coupling member 23 and the valve member 20 initially move as one against the action of the spring 27, until the valve member engages the seating 19. When movement of the valve member is halted, continued movement of the armature 25 and the coupling member 23 take place against the action of the spring 32 until the flange 24 engages the second stop surface 16. In this position a small air gap exists between the armature and the pole faces of the core of the solenoid.

The armature 25 is of generally rectangular section and is located within an opening of generally complementary shape in the end of the housing part 12. By virtue of its shape and that of the opening, the armature cannot rotate within the housing part. The armature is secured to the coupling member 23 by means of a pair of bolts 31 which lie on a diagonal of the armature and on the opposite sides of the opening in the armature which accommodates the thrust piece 28.

The coupling member 23 is cylindrical in form except that adjacent the armature it is provided with a pair of bosses to house the apertures which receive the bolts 30 securing the armature to the coupling member.

The process of setting the various gaps will now be described. It is convenient to first set the total travel of the armature and this is achieved by measuring the distance between the face of the flange 24 which engages the stop surface 16 and the face of the coupling member which engages the stop face 14 and then adding to the measured valve the required travel of the armature and coupling member. This measurement and calculation gives the required thickness of the ring 15A.

The gap between the armature 25 and the pole faces of the solenoid when the armature has completed its movement is next set by assembling the housing parts 12 and the ring 15B, the coupling member 23 and the armature 25 with a shim equal to the desired gap interposed between the armature 25 and the coupling member 23. With the surface of the flange 24 pressed firmly against the stop surface 16, the end face of the armature and the end face of the housing part 12 are ground flat. With the shim removed the end face of the armature will lie by the thickness of the shim, below the end face of the housing part. If desired however instead of grinding the end face of the armature selective assembly techniques can be utilised.

The lift of the valve member away from its seating in use is determined by setting the valve member at the desired lift and then grinding the end face of the valve member presented to the coupling member flush with the stop surface 14 of the valve body. The same surface is ground if the valve member is provided with an extension.

During the assembly of the valve the bolt 31 can be tightened by holding the abutment 30 against rotation using a key engaged within a non-circular opening in the abutment and a second key can be engaged with a non-circular opening in the abutment 30. Access to the latter is obtained by removing the thrust piece 28. The shim 33 is selected to provide the required spring force of the spring 32 and the length of the thrust piece 28 is chosen to produce the required spring force of the spring 27.

The valve construction as described is divided into three components, the solenoid housing 17, the valve body 10 together with the valve member 20 and the annular housing part 12 containing the coupling member 23 and the associated parts. If in the use of the valve a fault develops in any of the components it is possible to replace that component with a new component and no adjustment is required.

We claim:

1. An electromagnetically operable valve comprising a valve body, a bore in the body and a seating in the bore, a valve member slidable in the bore, an armature coupled to the valve member and a solenoid which when energised, causes movement of the armature to move the valve member into engagement with the seating, resilient means which opposes movement of the armature, an overtravel spring which forms part of a connection between the armature and the valve member and which yields to allow further movement of the armature towards the solenoid after the valve member has engaged the seating, said valve member in the closed position thereof projecting beyond a first stop surface defined by the valve body by an amount equal to the lift of the valve member in its fully open position, a hollow coupling member housed within a housing part extending between the valve body and the solenoid the coupling member defining a first surface for engagement with the first stop surface, a spring abutment movable within the coupling member, means coupling the spring abutment to the valve member, said overtravel spring being interposed between the abutment and a flange of the coupling member, a hollow housing part interposed between said first stop surface and a solenoid housing, a second stop surface defined by the housing part, a second surface defined by the coupling member for engagement with said second stop surface to limit the movement of the coupling member away from said first stop surface, the coupling member being secured to the armature so that the engagement of the second surface and the second stop surface limits the movement of the armature towards the solenoid, said resilient means acting on the coupling member.

2. A valve according to claim 1 in which said first surface is defined by an end of the coupling member and the second surface is defined by a face of a flange formed on the coupling member.

3. A valve according to claim 2 in which said resilient means is located within said coupling member and comprises a coiled compression spring one end of which engages the base wall of a cup shaped abutment located within the coupling member the abutment having an outwardly extending flange which engages an end face of the coupling member, the other end of the spring engaging a thrust piece which extends through a bore in the armature for engagement with the solenoid.

4. A valve according to claim 1 in which said spring abutment includes an internally screw threaded tubular portion and the valve member is hollow to receive a screw engageable with the tubular portion to secure the spring abutment to the valve member.

5. A valve according to claim 1 in which said second stop surface is defined upon a ring secured within the housing part said first and second stop surfaces being separated by a further ring interposed between said stop surfaces.

* * * * *